(12) United States Patent
Wedi

(10) Patent No.: US 9,795,254 B2
(45) Date of Patent: Oct. 24, 2017

(54) RECEIVING ELEMENT FOR INSERTION INTO AN OUTLET OPENING OF A SHOWER FLOOR PANEL, AND SHOWER FLOOR PANEL MODULE

(71) Applicant: wedi GmbH, Emsdetten (DE)

(72) Inventor: Stephan Wedi, Emsdetten (DE)

(73) Assignee: wedi GmbH, Emsdetten (DE)

( * ) Notice: Subject to any disclaimer, the term of this patent is extended or adjusted under 35 U.S.C. 154(b) by 75 days.

(21) Appl. No.: 14/844,782

(22) Filed: Sep. 3, 2015

(65) Prior Publication Data
US 2016/0073832 A1    Mar. 17, 2016

(30) Foreign Application Priority Data
Sep. 11, 2014   (DE) .................... 10 2014 113 096

(51) Int. Cl.
  *A47K 3/40*   (2006.01)
  *E03F 5/04*   (2006.01)
(52) U.S. Cl.
  CPC .............. *A47K 3/40* (2013.01); *E03F 5/0408* (2013.01)
(58) Field of Classification Search
  CPC .............................. A47K 3/40; E03F 5/0408
  USPC ............................................................. 4/613
  See application file for complete search history.

(56) References Cited

FOREIGN PATENT DOCUMENTS

| DE | 102004036652 A1 | 2/2005 |
|---|---|---|
| EP | 2041376 B1 | 2/2010 |
| WO | 2008009874 A1 | 1/2008 |

OTHER PUBLICATIONS

European Patent Office, Europaischer Recherchenbericht (search on related application), Jan. 27, 2016.
Deutsches Patent—Und Markenamt (German Patent and Trademark Office), Office Action on related application (DE 10 2014 113 096.0) (dated May 28, 2015).

*Primary Examiner* — Tuan N Nguyen
(74) *Attorney, Agent, or Firm* — Laurence P. Colton; Smith Tempel Blaha LLC

(57) ABSTRACT

A receiving element for a screw-type shower tray valve, for insertion into a continuous outlet opening of a shower floor panel, having a first flat side and a second flat side directed away from the first one, an annular body that can be inserted from the first flat side into the outlet opening and that bears with its bearing collar on the first flat side of the shower floor panel, the bearing collar merging into an inclined profiled wall of the annular body and running out into a cylindrical inner wall, and a support flange that can be inserted from the second flat side of the shower floor panel into the outlet opening and that bears with its bearing collar on the second flat side of the shower floor panel. The wall of the annular body and the support flange each has at least one circumferential rib.

14 Claims, 4 Drawing Sheets

RECEIVING ELEMENT FOR INSERTION INTO AN OUTLET OPENING OF A SHOWER FLOOR PANEL, AND SHOWER FLOOR PANEL MODULE

STATEMENT OF RELATED APPLICATIONS

This application claims foreign priority under 35 USC 119(b) on German Patent Application No. 102014113096.0 having a filing date of 11 Sep. 2014.

BACKGROUND OF THE INVENTION

Technical Field

The invention relates to a receiving element for a screw-type shower tray valve, for insertion into a continuous outlet opening of a shower floor panel, which has a first plane or concave flat side and a second flat side directed away from the first one, comprising:
- an annular body which can be inserted from the first flat side into the outlet opening of the shower floor panel and which bears with its bearing collar on the first flat side of the shower floor panel, wherein the bearing collar merges into an inclined profiled wall of the annular body and wherein the inclined wall runs out into a cylindrical inner wall,
- and a support flange which can be inserted from the second flat side of the shower floor panel into the outlet opening thereof and which bears with its bearing collar on the second flat side of the shower floor panel.

The invention further relates to a shower floor panel module composed of the shower floor panel and of the receiving element built into the latter.

Prior Art

A two-part receiving element of the aforementioned type and a shower floor panel module are commercially available from the applicant under the product name "wedi Fundo Ablauf senkrecht" (two-part receiving element) and "wedi Fundo" (shower floor panel module). Although said products have proven very popular on the German market and abroad, there is a need to further develop them in order to improve their design and to extend the range of products offered by the company.

BRIEF SUMMARY OF THE INVENTION

This object is achieved by a two-part receiving element according to the preamble, by virtue of the fact that
- the wall of the annular body has at least one circumferential rib, which is arranged vertically or at a slight inclination to the bearing collar of the annular body,
- the support flange likewise has at least one circumferential rib which is directed substantially perpendicular to the bearing collar of the support flange, wherein the ribs of the annular body and the ribs of the support flange are directed toward each other in the assembled state, and wherein at least one of the ribs of the annular body at least partially meshes with at least one rib of the support flange in the assembled state.

The meshing involves a reciprocal arrangement of the circumferential ribs which are at least partially engaged with one another or touch one another. The rib of the annular body can also be arranged contact-free between two ribs of the support flange or, conversely, the rib of the support flange can be arranged between the ribs of the annular body.

In this way, the ribs of the annular body and the ribs of the support flange, in the assembled state, can be connected to each other with a force fit, a form fit and/or a cohesive fit, if at least one rib is elastically deformable and/or an adhesive is used. The cylindrical inner wall of the annular body can likewise function as a rib.

The two-part receiving element can be secured in the opening of the shower floor panel by a combined connection, for example via a clamped and adhesively bonded connection.

It is also possible for the annular body and/or the support flange to be cohesively connected to the shower floor panel, for example by means of a layer of adhesive. The adhesive connection ensures a uniform stress distribution and force transmission across the whole adhesion surface and is able to withstand greater static and dynamic loads. Moreover, the adhesive connection is able to assume a sealing function that is desired in shower floor panel modules.

At least one of the ribs of the annular body and/or of the support flange can be segmented. Segmentation means that the rib has, at its periphery, at least two interruptions lying at equal or unequal distances from each other, which divide the rib into two or more spreading elements. In this way, the force applied during assembly can be uniformly distributed and the rib reacts more flexibly to elastic deformation.

The described rib arrangement permits manual, mechanical or robot-assisted assembly of the two parts, i.e. the annular body and the support flange, to form a unit built into the prefabricated shower floor panel.

Accordingly, the present invention also claims a shower floor panel module, which is composed of the prefabricated shower floor panel and of the two-part receiving element built into the shower floor panel. The shower floor panel module can be packaged and offered for sale in this form.

The shower floor panel can be made from solid plastic, fiber-reinforced plastic, such as synthetic resin, or from a body of raw foam covered on both sides with a reinforcement layer.

In a plan view of its flat side, the shower floor panel can be polygonal, in particular rectangular, or round, for example circular, oval, arc-shaped, kidney-shaped or snail-shaped.

As materials for producing the annular body and the support flange, it is possible to use thermoplastics such as HDPE or polycarbonate, thermosets or metals.

BRIEF DESCRIPTION OF THE DRAWINGS

Further features and advantages of the invention are explained on the basis of a number of illustrative embodiments and with reference to the drawing, in which.

DETAILED DESCRIPTION OF PREFERRED EMBODIMENTS

Figure 1:
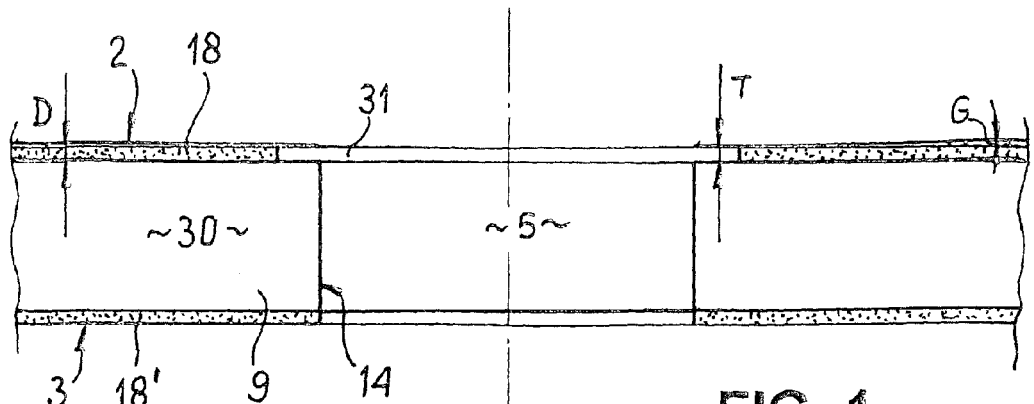
FIG. 1 shows a simplified schematic cross section of a shower floor panel before installation of the receiving element.

FIG. 1 shows a shower floor panel 9 comprising a raw foam body 30 made of HCFC-free, water-impermeable and thermally insulating extruded rigid polystyrene foam, which is affixed on both sides to a reinforced layer 18, 18' of synthetic mortar (synthetically modified coating mortar) in a permanent manner such that the join cannot be undone without being destroyed. The shower floor panel 9 has a slightly concave upper flat side 2, which runs toward a circular outlet opening 5, and a plane lower flat side 3. The outlet opening 5 has a cylindrical inner face 14. FIG. 1 also shows an annular shallow recess 31 whose depth T corresponds to a thickness D of the layer 18 of synthetic mortar or exceeds this thickness. Reference sign G indicates a gradient. The installed shower floor panel 9 is also tiled.

Figure 4:
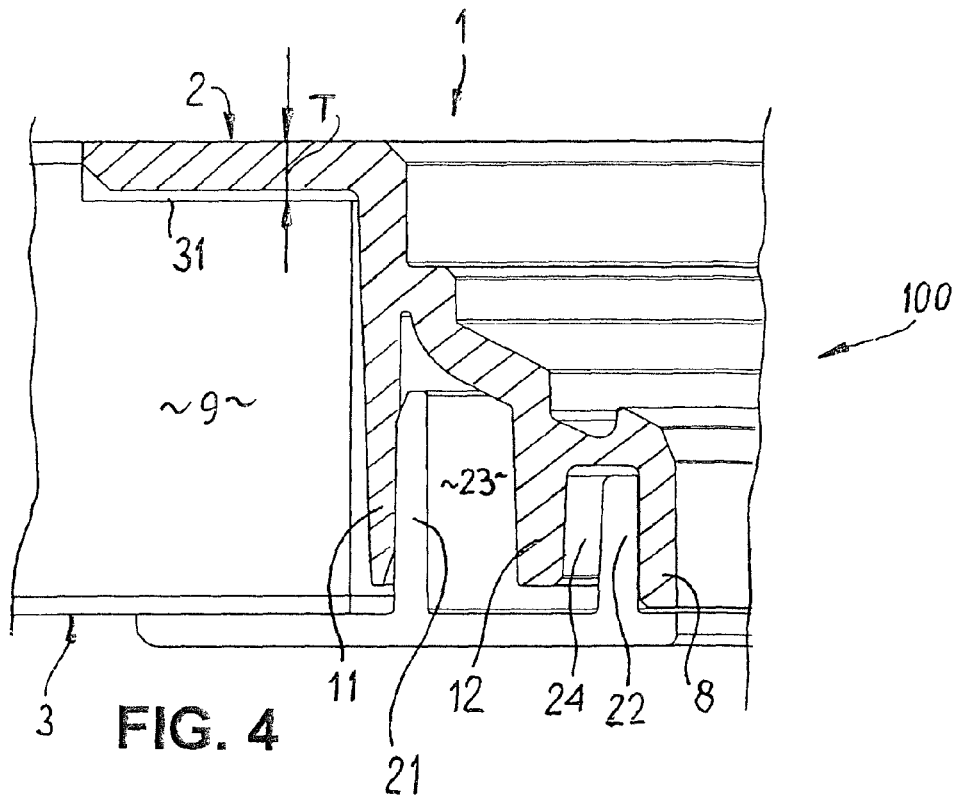
FIG. 4 shows a cross section of a shower floor panel module composed of the shower floor panel as per FIG. 1 and of a built-in receiving element.
Figure 5:
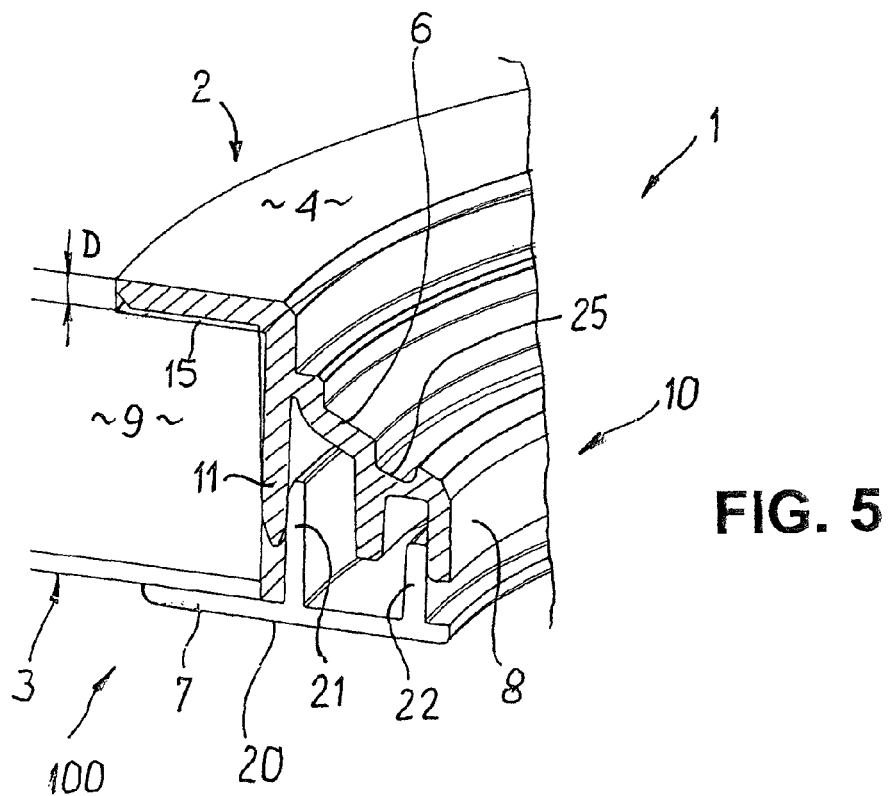
FIG. 5 shows a perspective view of the shower floor panel module as per FIG. 4.

The terms "upper", "lower", "top", "bottom", "above" etc. relate to the usual arrangement of the floor panel in a shower, for example as can be seen from FIGS. 4 and 5.

Figure 2:
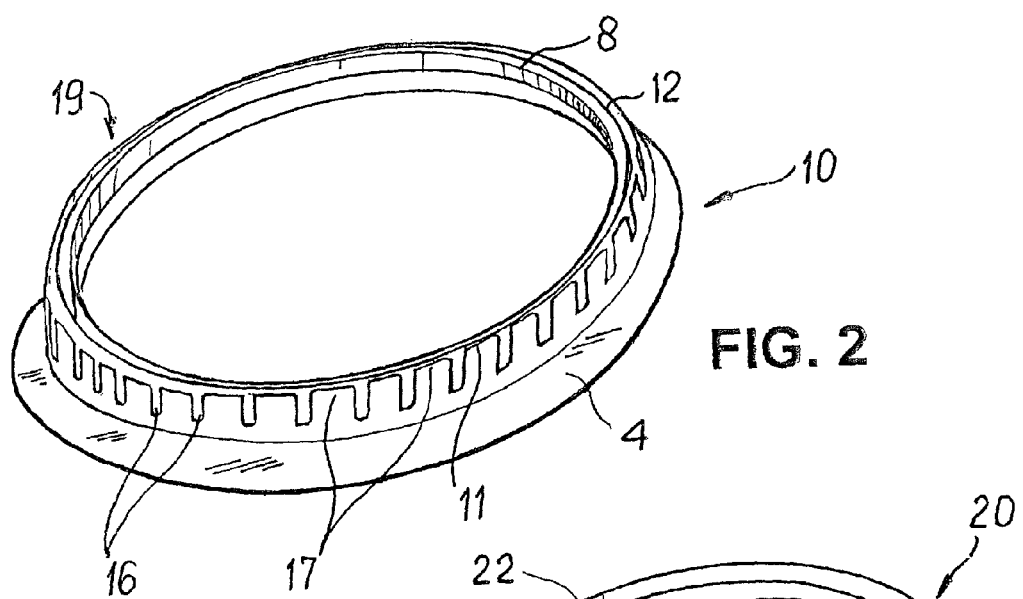
FIG. 2 shows an annular body in a perspective view.

An annular body 10 shown in FIGS. 2, 4 and 5, and produced from a material section, has a bearing collar 4, an inclined profiled wall 6, which runs out into a cylindrical, downwardly directed inner wall 8, and two circumferential and likewise downwardly pointing ribs 11, 12, wherein the rib 11 can be designated as an outer rib and the rib 12 can be designated as a central rib. The central rib 12 is arranged coaxially between the inner wall 8 and the outer rib 11. Circumferential annular spaces 23, 24 can be seen between the ribs 11, 12 and the inner wall 8. Moreover, the profiled wall 6 has a circumferential groove 25 for receiving an elastomeric sealing element (not shown).

In an advantageous configuration, the outer rib 11 has a plurality of more or less U-shaped interruptions 16 formed on its periphery 19, which divide the rib into elastically deformable spreading elements 17.

Figure 3:
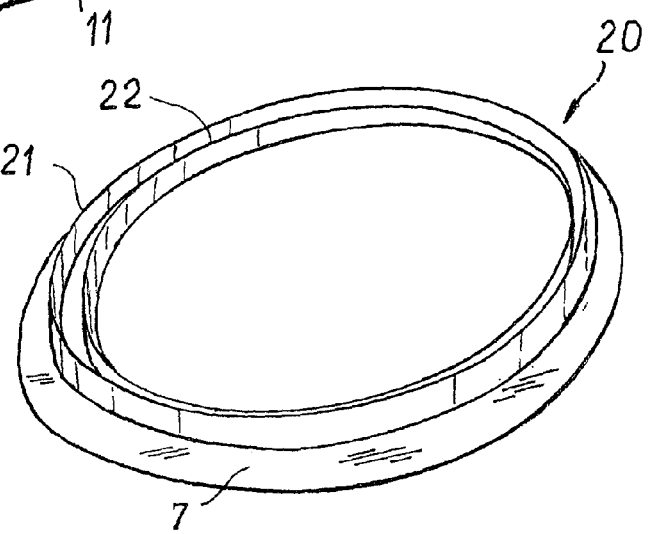
FIG. 3 shows a support flange in a perspective view.

FIG. 3 shows a ring-shaped support flange 20 which has a bearing collar 7 and two upwardly protruding ribs 21, 22, which are dimensioned such that, in the assembled state, they engage in the aforementioned spaces 23, 24 (cf. FIGS. 4 and 5).

FIGS. 4 and 5 show a receiving element 100 which is composed of the annular body 10 and the support flange 20 and which is placed in the outlet opening 5. The annular body 10 rests with its bearing collar 4 on the shallow recess 31, flush with the flat side 2 of the shower tray panel 9, and is adhesively bonded there to the raw foam body 30. However, it is also possible that the upper face of the bearing collar 4 is arranged offset with respect to the flat side 2 of the shower floor panel 9, such that a height offset exists between the flat side 2 and the upper face of the bearing collar. However, the thickness of the bearing collar 4 is less than the depth T of the shallow recess 31. Furthermore, the depth T can be made such that it includes a free space for a slight adhesive gap 15, which space has a size of 0.5 mm for example. In the present case, a hotmelt is used as the adhesive. As an alternative to a hotmelt adhesive, it is also possible to use other adhesives.

When the two parts of the receiving element 100 are pressed together, the segmented rib 11 yields slightly on account of the pressure force exerted by the upwardly directed rib 21 and presses against the inner face 14 of the outlet opening 5 (cf. FIG. 5). The rib 22 of the support flange 20 comes into planar contact with the downwardly pointing inner wall 8 of the annular body 10 and presses against it. The lower bearing collar 7 bears on the underside (flat side 3) of the shower floor panel 9. It is also possible for the lower bearing collar 7 to be arranged flush with the flat side 3.

Figure 6:
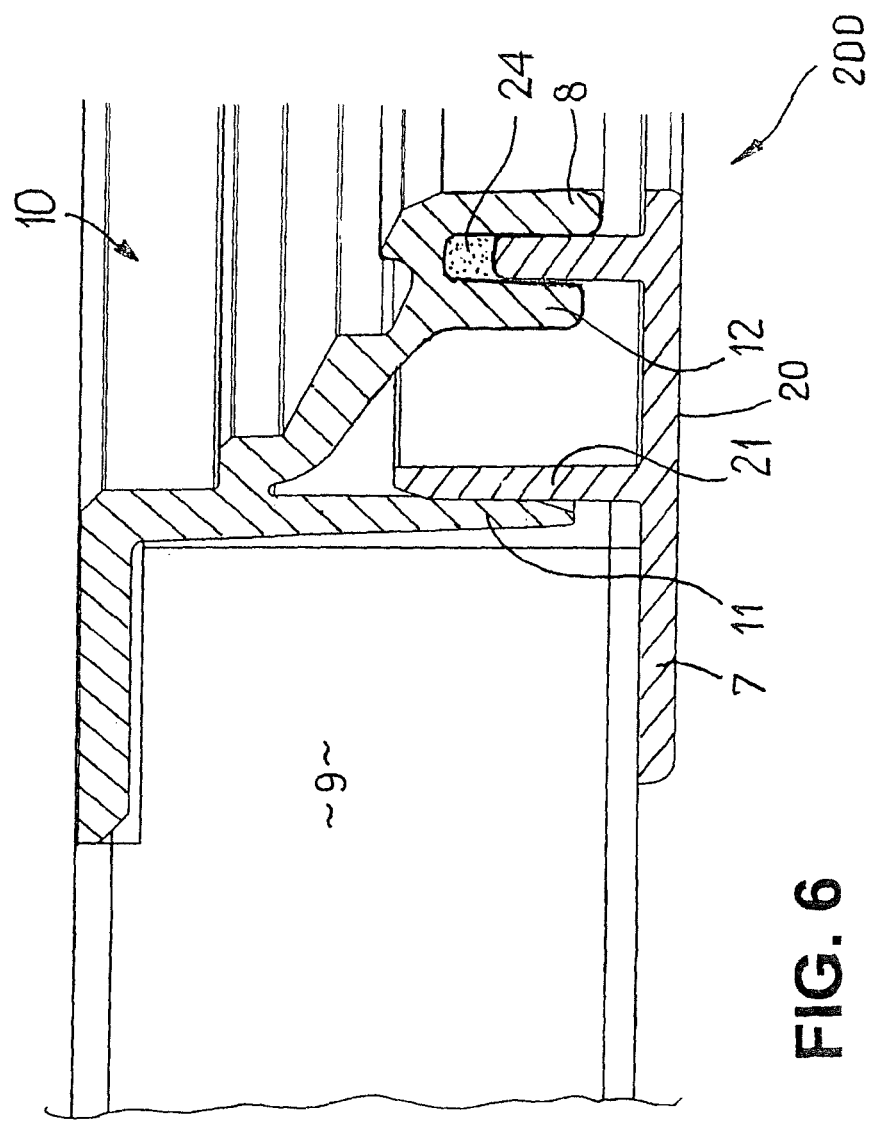
FIG. 6 shows a cross section of the shower floor panel module as per FIG. 4, with an adhesive filler indicated.

A similar receiving element (reference number 200) is shown in FIG. 6. The same reference signs designate the same parts. The difference between the receiving elements 100 and 200 is that the space 24 between the inner wall 8 and the rib 12 of the annular body 10 is narrower, such that it can be filled with a liquid adhesive or suitable sealing material.

Figure 7:
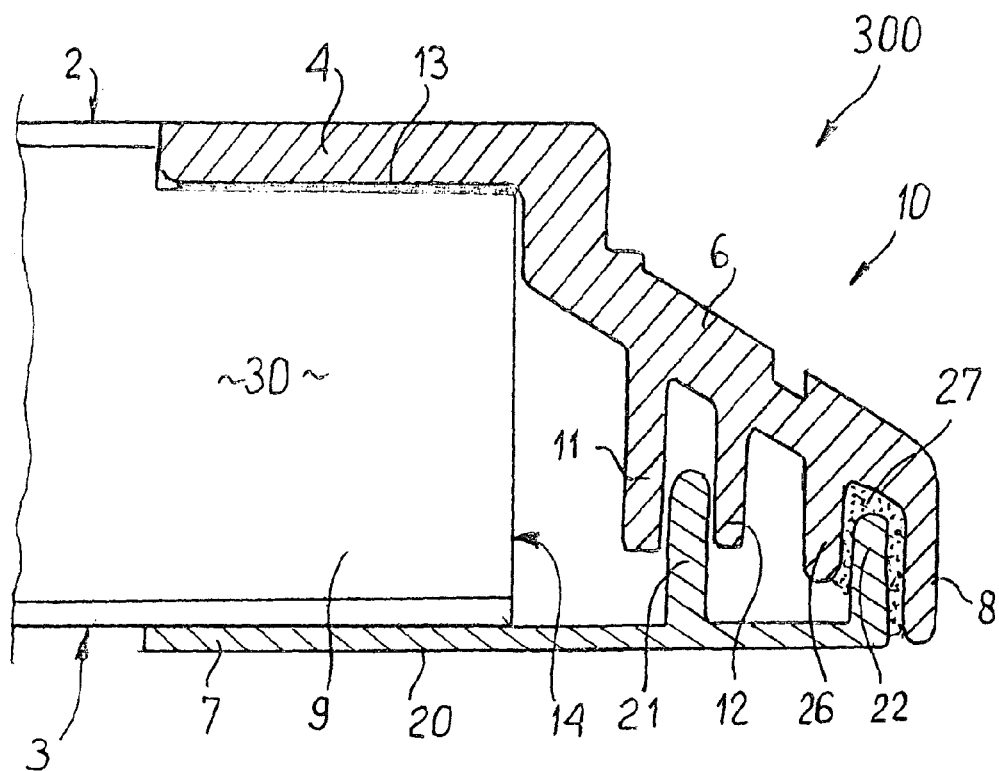
FIGS. 7 and 8 show other illustrative embodiments of the shower panel module, in each case in cross section.

Another receiving element 300, designed as per FIG. 7, is characterized by another rib arrangement. Three downwardly pointing ribs 11, 12, 26, instead of two, are arranged on the annular body 10, wherein the outer rib 11 lies remote from the inner face 14 (in the installed state) of the outlet opening. The rib 21 of the support flange 20 engages between the downwardly directed ribs 11, 12 and is clamped there by frictional force. The second rib (reference number 22) of the support flange 20 engages in a space 27 which is filled with a liquid adhesive or with suitable sealing material and which is delimited by the inner wall 8 and the rib 26. It is also possible, for example, for a double-sided adhesive film 13 to be placed in a circular shape in the adhesive gap 15 under the bearing collar 4.

Figure 8:
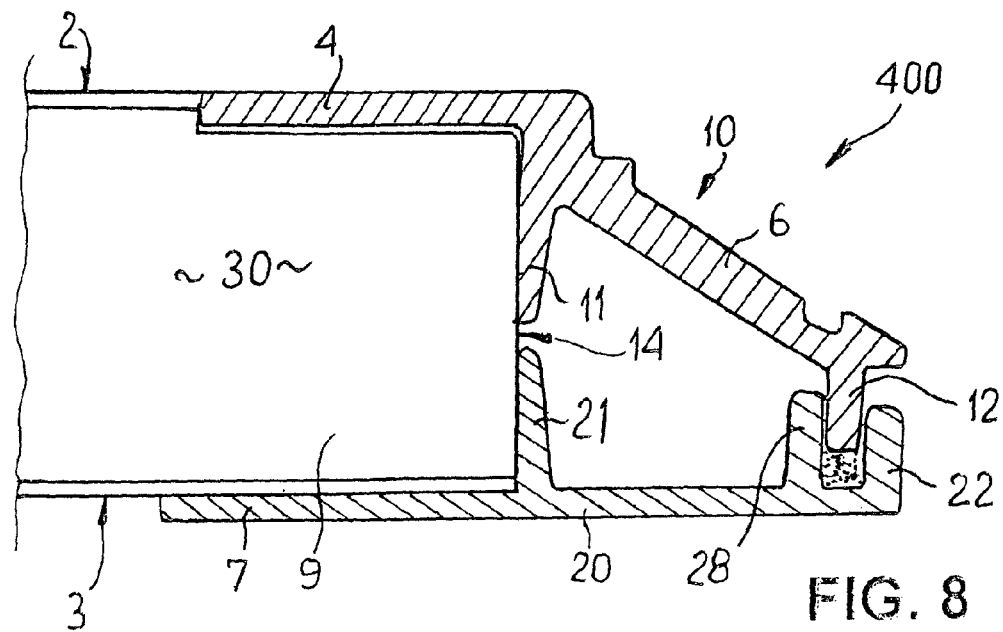

FIG. 8 shows a receiving element 400, of which the annular body 10 has two downwardly directed ribs 11 and 12, whereas the support flange 20 has three ribs 21, 22 and 28. The ribs 22 and 28 of the support flange 20 are filled with a liquid adhesive or suitable sealing material, into which the rib 12 of the annular body 10 engages in the assembled state, such that a corresponding connection is obtained there. The outer ribs 11 and 21 are directed toward each other and rest on the inner face 14 of the outlet opening 5. The two outer ribs 11 and 12 can be segmented.

Together with the inserted receiving element 100; 200; 300; 400, the shower floor panel 9 forms a shower floor panel module 1.

LIST OF REFERENCE SIGNS

1 shower floor panel module
2, 3 flat side
4 bearing collar (of 10)
5 outlet opening
6 inclined wall (of 10)
7 bearing collar (of 20)
8 inner wall, cylindrical
9 shower floor panel
10 annular body
11,12 rib
13 double-sided adhesive film
14 inner face
15 adhesive gap
16 interruption
17 spreading element
18, 18' layer of synthetic mortar
19 periphery
20 support flange
21, 22 rib
23, 24 space
25 groove
26 rib (FIG. 7)
27 space
28 rib (FIG. 8)
29 -
30 raw foam body
31 shallow recess
G gradient
D thickness (of 18)
T depth (of 31)
100; 200; 300; 400 receiving element

The invention claimed is:
1. A receiving element (100) for a screw-type shower tray valve, for insertion into a continuous outlet opening (5) of a shower floor panel (9), which has a first plane or concave flat side (2; 3) and a second flat side (3; 2) directed away from the first flat side (2; 3), comprising:

a) an annular body (10) that is insertable from the first flat side (2; 3) into the outlet opening (5) of the shower floor panel (9) and that bears with an annular body bearing collar (4) onto the first flat side (2; 3) of the shower floor panel (9), wherein the annular body bearing collar (4) merges into an inclined wall (6) of the annular body (10), and wherein the annular body (10) has at least one annular body circumferential rib (11, 12, 26) that is arranged vertically or at a slight inclination to the annular body bearing collar (4); and b) a support flange (20) that is insertable from the second flat side (3; 2) of the shower floor panel (9) into the outlet opening (5) thereof and that bears with a support flange bearing collar (7) onto the second flat side (3; 2) of the shower floor panel (9), wherein the support flange (20) has at least one support flange circumferential rib (21, 22, 28) that is directed substantially perpendicular to the support flange bearing collar (7) of the support flange (20), wherein:

each of at least one annular body circumferential rib (11, 12, 26) and each of at least one support flange circumferential rib (21, 22, 28) are directed toward each other in an assembled state;

at least one of the at least one annular body circumferential rib (11) at least partially meshes with at least one of the at least one support flange circumferential rib (21) in the assembled state;

the inclined wall (6) has at least one of the at least one annular body circumferential rib (11, 12, 26) and a profile and runs out into a cylindrical inner wall (8);

the annular body circumferential rib (11) and the support flange circumferential rib (21) that are at least partially meshed with each other in the assembled state are connected to each other with a force fit; and the annular body circumferential rib (11) that at least partially meshes with the support flange circumferential rib (21) in the assembled state has a periphery (19) and is segmented on the periphery (19), whereby when the annular body (10) and the support flange (20) are pressed together, the segmented annular body circumferential rib (11) yields slightly on account of a pressure force exerted by the support flange circumferential rib (21) and presses against an inner face (14) of the outlet opening (5).

2. A shower floor panel module (1) comprising a prefabricated shower floor panel (9) and a receiving element (100) built into the shower floor panel (9), the shower floor panel (9) having a first plane or concave flat side (2; 3) and a second flat side (3; 2) directed away from the first flat side (2; 3), the receiving element comprising:

a) an annular body (10) that is insertable from the first flat side (2; 3) into the outlet opening (5) of the shower floor panel (9) and that bears with an annular body bearing collar (4) on the first flat side (2; 3) of the shower floor panel (9), wherein the annular body bearing collar (4) merges into an inclined wall (6) of the annular body (10) and wherein the annular body (10) has at least one annular body circumferential rib (11, 12, 26) that is arranged vertically or at a slight inclination to the annular body bearing collar (4); and b) a support flange (20) that is insertable from the second flat side (3; 2) of the shower floor panel (9) into the outlet opening (5) thereof and that bears with a support flange bearing collar (7) on the second flat side (3; 2) of the shower floor panel (9), wherein the support flange (20) has at least one support flange circumferential rib (21, 22, 28) that is directed substantially perpendicular to the support flange bearing collar (7) of the support flange (20), wherein:

each of at least one annular body circumferential rib (11, 12, 26) and each of at least one support flange circumferential rib (21, 22, 28) are directed toward each other in an assembled state;

at least one of the at least one annular body circumferential rib (11) at least partially meshes with at least one of the at least one support flange circumferential rib (21) in the assembled state;

the inclined wall (6) has a profile and runs out into a cylindrical inner wall (8);

the annular body circumferential rib (11) that at least partially meshes with the support flange circumferential rib (21) in the assembled state are connected to each other with a force fit; and the annular body circumferential rib (11) that at least partially meshes with the support flange circumferential rib (21) in the assembled state has a periphery (19) and is segmented on the periphery (19), whereby when the annular body (10) and the support flange (20) are pressed together, the segmented annular body circumferential rib (11) yields slightly on account of a pressure force exerted by the support flange circumferential rib (21) and presses against an inner face (14) of the outlet opening (5).

3. The shower floor panel module (1) according to claim 2, wherein:

in the area of the outlet opening (5), a ring-shaped shallow recess (31) that extends into the material of a raw foam body (30) of the shower floor panel (9) is worked into the first flat side (2; 3) of the shower floor panel (9); and the annular body bearing collar (4) bears on the raw foam body (30) in the area of the shallow recess (31) and lies flush with the first flat side (2; 3) of the shower floor panel (9).

4. The shower floor panel module (1) according to claim 2, wherein the at least one annular body circumferential rib (11) is clamped, in the assembled state, between the at least one support flange circumferential rib (21) and an inner face (14) of the outlet opening (5) of the shower floor panel (9).

5. The shower floor panel module (1) according to claim 2, wherein the at least one annular body circumferential rib (11) and the at least one support flange circumferential rib (21), lying one above the other, both press against an inner face (14) of the outlet opening (5) of the shower floor panel (9) in the assembled state.

6. The shower floor panel module (1) according to claim 3, wherein the annular body bearing collar (4) is adhesively bonded to the raw foam body (30) in the area of the shallow recess (31).

7. The shower floor panel module (1) according to claim 6, wherein the annular body bearing collar (4) is connected to the raw foam body (30) via a double-sided adhesive film (13) applied in a circular shape.

8. A receiving element (100) for a screw-type shower tray valve, for insertion into a continuous outlet opening (5) of a shower floor panel (9), which has a first flat side (2; 3) and a second flat side (3; 2) directed away from the first flat side (2; 3), comprising:

a) an annular body (10) that is insertable from the first flat side (2; 3) into the outlet opening (5) of the shower floor panel (9) and that bears with an annular body bearing collar (4) onto the first flat side (2; 3) of the shower floor panel (9), wherein the annular body bearing collar (4) merges into an inclined wall (6) of the annular body (10), and wherein the annular body (10) has an annular body circumferential rib (11) that is arranged vertically or at a slight inclination to the annular body bearing collar (4); and b) a support flange (20) that is insertable from the second flat side (3; 2) of the shower floor panel (9) into the outlet opening (5) thereof and that bears with a support flange bearing collar (7) onto the second flat side (3; 2) of the shower floor panel (9), wherein the support flange (20) has a support flange circumferential rib (21) that is directed substantially perpendicular to the support flange bearing collar (7) of the support flange (20), wherein:

the annular body circumferential rib (11) and the support flange circumferential rib (21) are directed toward each other in an assembled state;

the annular body circumferential rib (11) at least partially meshes with the support flange circumferential rib (21) in the assembled state;

the inclined wall (6) has at least one of the at least one annular body circumferential rib (11, 12, 26) and a profile and runs out into a cylindrical inner wall (8);

the annular body circumferential rib (11) and the support flange circumferential rib (21) that are at least partially meshed with each other in the assembled state are connected to each other with a force fit; and the annular body circumferential rib (11) that at least partially meshes with the support flange circumferential rib (21) in the assembled state has a periphery (19) and is segmented on the periphery (19), whereby when the annular body (10) and the support flange (20) are pressed together, the segmented annular body circumferential rib (11) yields slightly on account of a pressure force exerted by the support flange circumferential rib (21) and presses against an inner face (14) of the outlet opening (5).

9. A shower floor panel module (1) comprising a prefabricated shower floor panel (9) and a receiving element (100) built into the shower floor panel (9), the shower floor panel (9) having a first side (2; 3) and a second side (3; 2) directed away from the first side (2; 3), the receiving element comprising:

a) an annular body (10) that is insertable from the first side (2; 3) into the outlet opening (5) of the shower floor panel (9) and that bears with an annular body bearing collar (4) onto the first side (2; 3) of the shower floor panel (9), wherein the annular body bearing collar (4) merges into an inclined wall (6) of the annular body (10), and wherein the annular body (10) has an annular body circumferential rib (11) that is arranged vertically or at a slight inclination to the annular body bearing collar (4); and b) a support flange (20) that is insertable from the second side (3; 2) of the shower floor panel (9) into the outlet opening (5) thereof and that bears with a support flange bearing collar (7) onto the second side (3; 2) of the shower floor panel (9), wherein the support flange (20) has a support flange circumferential rib (21) that is directed substantially perpendicular to the support flange bearing collar (7) of the support flange (20), wherein:

the annular body circumferential rib (11) and the support flange circumferential rib (21) are directed toward each other in an assembled state;

the annular body circumferential rib (11) at least partially meshes with the support flange circumferential rib (21) in the assembled state;

the inclined wall (6) has a profile and runs out into a cylindrical inner wall (8);

the annular body circumferential rib (11) and the support flange circumferential rib (21) that are at least partially meshed with each other in the assembled state are connected to each other with a force fit; and the annular body circumferential rib (11) that at least partially meshes with the support flange circumferential rib (21) in the assembled state has a periphery (19) and is segmented on the periphery (19), whereby when the annular body (10) and the support flange (20) are pressed together, the segmented annular body circumferential rib (11) yields slightly on account of a pressure force exerted by the support flange circumferential rib (21) and presses against an inner face (14) of the outlet opening (5).

10. The shower floor panel module (1) according to claim 9, wherein:

in the area of the outlet opening (5), a ring-shaped shallow recess (31) that extends into the material of a raw foam body (30) of the shower floor panel (9) is worked into the first side (2; 3) of the shower floor panel (9); and the annular body bearing collar (4) bears on the raw foam body (30) in the area of the shallow recess (31) and lies flush with the first side (2; 3) of the shower floor panel (9).

11. The shower floor panel module (1) according to claim 9, wherein the annular body circumferential rib (11) is clamped, in the assembled state, between the support flange circumferential rib (21) and an inner face (14) of the outlet opening (5) of the shower floor panel (9).

12. The shower floor panel module (1) according to claim 9, wherein the annular body circumferential rib (11) and the support flange circumferential rib (21), lying one above the other, both press against an inner face (14) of the outlet opening (5) of the shower floor panel (9) in the assembled state.

13. The shower floor panel module (1) according to claim 10, wherein the annular body bearing collar (4) is adhesively bonded to the raw foam body (30) in the area of the shallow recess (31).

14. The shower floor panel module (1) according to claim 13, wherein the annular body bearing collar (4) is connected to the raw foam body (30) via a double-sided adhesive film (13) applied in a circular shape.

* * * * *